UNITED STATES PATENT OFFICE.

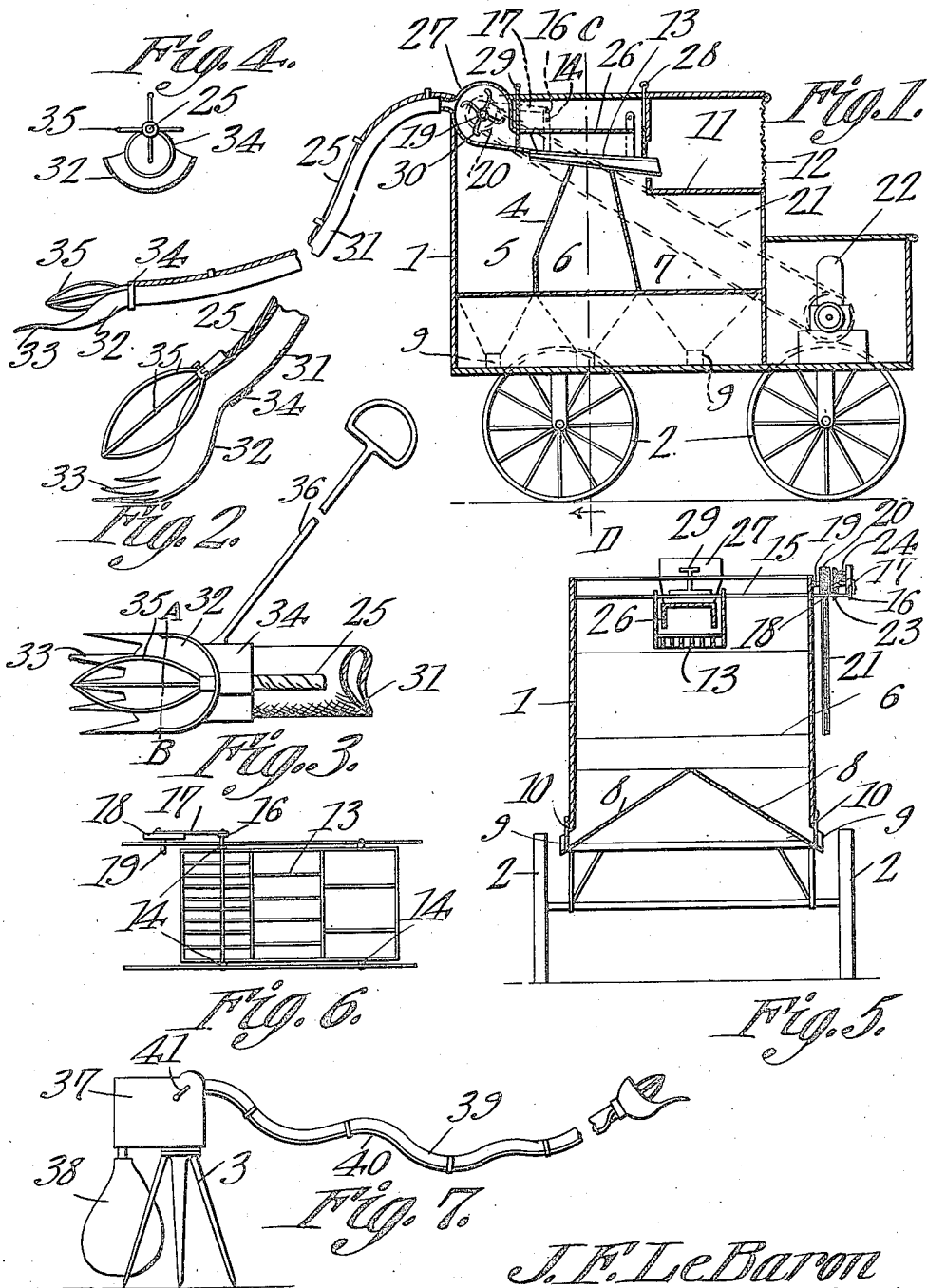

JOHN FRANCIS LE BARON, OF CHARDON, OHIO.

BERRY-PICKER.

1,185,110.

Specification of Letters Patent.

Patented May 30, 1916.

Application filed May 2, 1913. Serial No. 765,165.

*To all whom it may concern:*

Be it known that I, JOHN FRANCIS LE BARON, a citizen of the United States, residing at Chardon, in the county of Geauga and State of Ohio, have invented a new and useful Berry-Picker, of which the following is a specification.

This invention relates to machines for picking berries, one of its objects being to provide a structure of this character which can be manipulated readily and which includes means designed to reach between the limbs of the berry bushes so as to agitate the berries and thus detach them.

A further object is to provide means for receiving the detached berries where they are acted upon by an air current which operates to draw the berries into position above a separator employed for grading the berries and freeing them of leaves and other trash.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—Figure 1 is a view partly in section and partly in elevation through a machine embodying the present improvements, parts being broken away. Fig. 2 is a section on an enlarged scale of the active end portion of the collecting trunk. Fig. 3 is a plan view of the structure shown in Fig. 2. Fig. 4 is a section on line A—B Fig. 3. Fig. 5 is a section on line C—D Fig. 1. Fig. 6 is a plan view of the mechanism employed for actuating the grizzly or separator. Fig. 7 is a side elevation of a modified structure, a portion of the trunk being broken away.

Referring to the figures by characters of reference 1 designates a main receptacle which can be mounted upon supporting wheels 2, as shown in Fig. 1 or can be arranged upon a tripod 3 or other suitable support, as shown in Fig. 7.

The receptacle 1 shown in Fig. 1 is preferably divided, by partitions 4, into separate compartments such as indicated at 5, 6, and 7 respectively. The bottom of each of these compartments is preferably inclined from its center downwardly to the sides thereof, as shown at 8 in Fig. 5, there being an outlet opening 9 at each side of the bottom of each receptacle, these openings being closed in any preferred manner, as by means of gates 10 of any desired construction. Mounted within the upper portion of the body 1 preferably at one end thereof is a trash receptacle 11, one or more walls of which is preferably formed of a screen fabric 12 or the like. A separator 13, which can be in the form of an ordinary grizzly, is suspended above the compartments 5, 6 and 7 and has its bars or meshes so arranged and proportioned that the smaller berries discharged onto the grizzly will fall into the compartment 5, the medium grade berries will discharge into the compartment 6, and the larger berries will discharge into the compartment 7. Tailings from the grizzly or separator 13 are discharged into the trash receptacle 11. This separator 13 is preferably supported by pivoted arms 14 hung within the body 1. these arms being preferably mounted on cross shafts 15. One of these shafts, to which the arms 14 are secured, has a crank arm 16 connected, by means of a link 17, to a disk 18 which rotates with a shaft 19 journaled upon one side of the body 1. Said shaft 19 is adapted to receive motion through a sprocket 20 and a chain 21, from a motor 22 mounted at any desired point adjacent the body 1. Obviously instead of using a chain and sprocket, a belt and pulley may be employed. Furthermore instead of utilizing a motor for actuating shaft 19, said shaft can be rotated by hand. A gear 23 rotates with shaft 19 and meshes with a smaller gear 24 located at one end of a flexible shaft 25.

Extending above the bottom of the separator or grizzly 13 is an outlet pipe 26, this pipe extending from the outlet of a fan casing 27 located in the front portion of the body 1 at the top thereof. Said pipe 26 is open at its rear end and discharges at said end into the receptacle 11. Cut-offs 28 and 29 are adjustably mounted in the outlet pipe 26 adjacent the ends of the pipe and constitute means for controlling the flow of air therethrough. The bottom of the pipe is open directly above the bottom of the grizzly so that solid substances discharged into the pipe will be free to gravitate onto the bottom of the grizzly where separation or grading may be effected.

The shaft 19 hereinbefore referred to, extends transversely through the body 1 and through the center of the casing 27 and carries a fan 30. A flexible inlet pipe 31 opens into the casing 27 and is provided, at its free end, with a gathering member in the form of a scoop-like extension 32 from the free end of which extend fingers 33. Flexible shaft 25 is extended along the flexible pipe 31 and is provided with bearings 34 arranged at desired points. The free end of this flexible shaft has an agitator or beater in the form of oppositely disposed bowed members 35 connected at their ends as shown particularly in Figs. 2 and 3. A handle 36 may be extended from the extension 32 so that said extension can be conveniently manipulated.

In using the apparatus, the shaft 19 is set in motion and the fan 30 will thus create a suction through the pipe 31 into casing 27 and will force a current of air outwardly through pipe 26. The force of the suction can be controlled by partly or entirely opening the cut-off 29. During this rotation of shaft 19, motion will be transmitted from disk 18 through link 17 and crank arm 16 to the arms 14 and the grizzly or separator 13 will thus be reciprocated so that any substances deposited thereon will be agitated. By means of the handle 36 the operator can force the extension 32 into the berry bushes and as the shaft 25 and the agitator 35 are rotated at a high speed during the operation of shaft 19 through the gears 23 and 24, it will be obvious that when the extension 32 is forced into the bushes, the agitator 35 will quickly separate the berries from the twigs so that they will gravitate into the extension 32 where they will be caught by the air currents rushing into the pipe or trunk 31 and thus conveyed to the casing 27. From this casing the berries will be directed outwardly into the pipe 26, the speed of movement through the pipe being regulated by the cut-offs 28 and 29. Upon entering the pipe 26, the berries gravitate through the open bottom thereof onto the bottom of the separator 13 where they are graded, the smaller berries falling into the compartment 5, the middle grade of berries falling into compartment 6 and the larger berries falling into compartment 7. The leaves and other trash will discharge as tailings from the separator and into the receptacle 11. The air current will be dissipated through the screen 12 so that the walls of receptacle 11 will not retard the production of a suction through the trunk or pipe 31. The berries can be removed from the respective compartments by opening the proper closures 10.

As shown in Fig. 7, instead of mounting the body 1 upon supporting wheels, smaller machines can be built in which the bodies 37 can be located on tripods 3 or the like. The berries when removed from this body 37 can be received by a bag 38 or the like provided therefor. Furthermore the body can be divided into two or more compartments each of which has one of these receiving bags although, in the structure shown in Fig. 7, only a single compartment is provided in the body, this compartment having the berry receiving bag connected to its outlet as shown.

Suction can be created through the trunk 39 of this modified structure by means of a fan such as shown in Fig. 1 and which fan can be rotated by hand, the means for operating the flexible shaft 40 from the fan shaft being the same as those hereinbefore described. In Fig. 7 the crank arm coöperating with the fan shaft has been illustrated at 41.

It will be apparent that by providing a machine such as herein described, berries can be quickly picked without becoming unduly bruised and without inconvenience to the operator. Furthermore the berries in a large machine, such as shown in Fig. 1, are not only picked but are also graded and can be discharged from the machine into crates or the like provided for the different grades.

What is claimed is:—

In a machine of the class described, the combination with a pipe open at the bottom throughout the width and length thereof, and a screen extending across the bottom and beyond the end thereof, of a receptacle for receiving screenings, a receptacle for receiving tailings into which the end of the screen projects, means for directing a current of air carrying material to be screened, longitudinally of the pipe, and a gate adjacent the discharge end of the screen in advance of the tailings receptacle and adjustable toward or from the screen to direct a part of or the entire air current downwardly through the screen, thus to vary the pressure of the current carrying material against the screen.

In testimony that I claim the foregoing as my own, I have hereto affixed my signature in the presence of two witnesses.

JOHN FRANCIS LE BARON.

Witnesses:
 EMMER STUMPHL,
 I. W. HEIDEMANN.